United States Patent
Bair et al.

(10) Patent No.: US 8,043,512 B2
(45) Date of Patent: Oct. 25, 2011

(54) FLUID TREATMENT ARRANGEMENTS AND METHODS

(75) Inventors: James A. Bair, Cortland, NY (US); Thomas J. Fendya, Homer, NY (US); Mark F. Hurwitz, Ithaca, NY (US); Tanweer ul Haq, Tully, NY (US); Stephen A. Geibel, Cortland, NY (US)

(73) Assignee: Pall Corporation, Port Washington, NY (US)

( * ) Notice: Subject to any disclaimer, the term of this patent is extended or adjusted under 35 U.S.C. 154(b) by 866 days.

(21) Appl. No.: 12/101,392

(22) Filed: Apr. 11, 2008

(65) Prior Publication Data
US 2009/0255877 A1    Oct. 15, 2009

(51) Int. Cl.
*B01D 21/34* (2006.01)
*B01D 61/00* (2006.01)
*B01D 63/10* (2006.01)

(52) U.S. Cl. .......... 210/739; 210/137; 210/321.74; 210/321.76

(58) Field of Classification Search .......... 210/739, 210/137, 321.74, 321.76
See application file for complete search history.

(56) References Cited

U.S. PATENT DOCUMENTS

| | | |
|---|---|---|
| 1,872,430 A | 8/1932 | Ericson |
| 3,266,223 A | 8/1966 | Dresser et al. |
| 3,367,504 A | 2/1968 | Westmoreland |
| 3,386,583 A | 6/1968 | Merten |
| 3,417,870 A | 12/1968 | Bray |
| 3,455,460 A | 7/1969 | Mahon et al. |
| 3,722,696 A | 3/1973 | Dwyer et al. |
| 3,827,564 A | 8/1974 | Rak |
| 3,925,037 A | 12/1975 | Ward, III et al. |
| 3,993,816 A | 11/1976 | Baudet et al. |
| 4,083,780 A | 4/1978 | Call |
| 4,105,547 A | 8/1978 | Sandblom |
| 4,252,651 A | 2/1981 | Soderstrom |
| 4,411,785 A | 10/1983 | Yu et al. |
| 4,412,553 A | 11/1983 | Kopp et al. |
| 4,435,289 A | 3/1984 | Breslau |
| 4,624,784 A | 11/1986 | Lefebvre |
| 4,661,458 A | 4/1987 | Berry et al. |
| 4,715,955 A | 12/1987 | Friedman |
| 4,735,718 A | 4/1988 | Peters |

(Continued)

FOREIGN PATENT DOCUMENTS

DE    1 792 446    4/1971
(Continued)

OTHER PUBLICATIONS

International Preliminary Examination Report for International Application No. PCT/US00/02071.

(Continued)

*Primary Examiner* — David A Reifsnyder
(74) *Attorney, Agent, or Firm* — Leydig, Voit & Mayer (57) ABSTRACT

Fluid treatment arrangements and methods involve a spirally wound fluid treatment pack. The fluid treatment pack includes a fluid treatment medium, a feed region, and a permeate region. The feed region extends along a feed surface of the fluid treatment medium and the permeate region extends along a permeate surface of the fluid treatment medium. The fluid treatment pack is spirally wound around a core assembly to form a plurality of windings of the feed region, a plurality of windings of the fluid treatment medium, and a plurality of windings of the permeate region.

28 Claims, 5 Drawing Sheets

U.S. PATENT DOCUMENTS

| | | | |
|---|---|---|---|
| 4,746,436 A | 5/1988 | Kopp et al. |
| 4,756,835 A | 7/1988 | Wilson |
| 4,792,401 A | 12/1988 | Truex et al. |
| 4,814,079 A | 3/1989 | Schneider |
| 4,849,102 A | 7/1989 | Latour et al. |
| 4,855,058 A | 8/1989 | Holland et al. |
| 4,867,876 A | 9/1989 | Kopf |
| 4,882,050 A | 11/1989 | Kopf |
| 4,885,087 A | 12/1989 | Kopf |
| 4,895,806 A | 1/1990 | Le et al. |
| 4,935,142 A | 6/1990 | Sternberg |
| 4,956,085 A | 9/1990 | Kopf |
| 4,969,997 A | 11/1990 | Klüver et al. |
| 5,034,124 A | 7/1991 | Kopf |
| 5,049,268 A | 9/1991 | Kopf |
| 5,096,582 A | 3/1992 | Lombardi et al. |
| 5,114,582 A | 5/1992 | Sandstrom et al. |
| 5,128,037 A | 7/1992 | Pearl et al. |
| 5,143,630 A | 9/1992 | Rolchigo |
| 5,147,541 A | 9/1992 | McDermott, Jr. et al. |
| 5,232,589 A | 8/1993 | Kopf |
| 5,248,418 A | 9/1993 | Munch |
| 5,256,294 A | 10/1993 | Van Reis |
| 5,304,312 A | 4/1994 | Forster et al. |
| 5,342,517 A | 8/1994 | Kopf |
| 5,437,796 A | 8/1995 | Brüschke et al. |
| 5,490,926 A | 2/1996 | Hammeken |
| 5,490,937 A | 2/1996 | Van Reis |
| 5,525,144 A | 6/1996 | Gollan |
| 5,544,171 A | 8/1996 | Gödecker |
| 5,593,580 A | 1/1997 | Kopf |
| 5,620,605 A | 4/1997 | Møller |
| 5,679,249 A | 10/1997 | Fendya et al. |
| 5,681,464 A | 10/1997 | Larsson |
| 5,685,990 A | 11/1997 | Saugmann et al. |
| 5,693,229 A | 12/1997 | Hartmann |
| 5,716,559 A | 2/1998 | Larsen et al. |
| 5,824,217 A | 10/1998 | Pearl et al. |
| 5,945,000 A | 8/1999 | Skidmore et al. |
| 6,001,974 A | 12/1999 | Demmer et al. |
| 6,068,771 A | 5/2000 | McDermott et al. |
| 6,088,592 A | 7/2000 | Doner et al. |
| 6,212,407 B1 | 4/2001 | Hiramatsu |
| 6,251,275 B1 | 6/2001 | Rekers |
| 6,304,759 B1 | 10/2001 | Jiang et al. |
| 6,363,261 B1 | 3/2002 | Raghavan |
| 6,432,310 B1 | 8/2002 | Andou et al. |
| 6,478,969 B2 | 11/2002 | Brantley et al. |
| 6,533,937 B1 | 3/2003 | Adachi et al. |
| 6,537,456 B2 | 3/2003 | Mukhopadhyay |
| 6,565,747 B1 | 5/2003 | Shintani et al. |
| 6,622,020 B1 | 9/2003 | Seki |
| 6,702,941 B1 | 3/2004 | Haq et al. |
| 7,316,780 B1 | 1/2008 | Fendya et al. |
| 7,357,866 B2 | 4/2008 | Diemer et al. |
| 2002/0134724 A1 | 9/2002 | Heine et al. |
| 2003/0034293 A1 | 2/2003 | Simonetti |
| 2005/0029192 A1 | 2/2005 | Arnold et al. |
| 2005/0056600 A1 | 3/2005 | Ranney |
| 2008/0251444 A1 | 10/2008 | Fendya et al. |
| 2010/0018924 A1* | 1/2010 | Fendya et al. ............ 210/137 |

FOREIGN PATENT DOCUMENTS

| | | |
|---|---|---|
| DE | 39 27 455 C1 | 8/1990 |
| DE | 34 48 391 C2 | 11/1991 |
| DE | 41 14 611 A1 | 11/1991 |
| DE | 43 42 485 C1 | 3/1995 |
| DE | 44 27 354 A1 | 2/1996 |
| DE | 201 06 646 U1 | 9/2001 |
| EP | 0 078 659 A2 | 5/1983 |
| EP | 0 443 257 A1 | 12/1990 |
| EP | 2 008 705 A1 | 12/2008 |
| GB | 1 417 973 | 12/1975 |
| JP | 59-073008 | 4/1984 |
| JP | 60-041505 | 3/1985 |
| JP | 62-204802 | 9/1987 |
| JP | 63-097207 | 4/1988 |
| JP | 05-208120 | 8/1993 |
| JP | 09-141060 | 6/1997 |
| JP | 11-267470 A | 10/1999 |
| WO | WO 96/01676 | 1/1996 |
| WO | WO 97/13571 | 4/1997 |
| WO | WO 00/13767 A1 | 3/2000 |
| WO | WO 00/78436 A1 | 12/2000 |
| WO | WO 01/58575 A1 | 8/2001 |
| WO | WO 01/89669 A2 | 11/2001 |
| WO | WO 02/32533 A2 | 4/2002 |
| WO | WO 02/070102 A2 | 9/2002 |
| WO | WO 03/055580 A1 | 7/2003 |
| WO | WO 2005/094963 A1 | 10/2005 |
| WO | WO 2007/038542 A2 | 4/2007 |

OTHER PUBLICATIONS

Belfort et al., "The Behavior of Suspensions and macromolecular Solutions in Crossflow Microfiltration", Journal of Membrane Science, 96 (1994) 1-58.

Hammer et al, "Quantitative Flow Measurements in Bioreactors by Nuclear Magnetic Resonance Imaging", Biotechnology, vol. 8, No. 4, Apr. 1990.

*Koch Membrane Systems Launches World's Largest Reverse Osmosis Element*, Koch Membrane Systems, Inc.

*Introducing Donaldson PowerCore™ Filtration Technology*, Brochure No. F111112 (Mar. 2002).

* cited by examiner

FLUID TREATMENT ARRANGEMENTS AND METHODS

GENERAL DISCLOSURE OF THE INVENTION

The present invention relates to fluid treatment arrangements and methods which include a spirally wound fluid treatment pack. The fluid treatment pack includes a fluid treatment medium having a feed surface and a permeate surface. The fluid treatment pack also includes a feed region and a permeate region. The feed region extends along the feed surface of the fluid treatment medium and the permeate region extends along the permeate surface of the fluid treatment medium. The fluid treatment arrangement further includes a core assembly having a longitudinal axis. The fluid treatment pack is spirally wound around the core assembly to form a plurality of windings, i.e., turns, including a plurality of windings of the feed region, a plurality of windings of the fluid treatment medium, and a plurality of windings of the permeate region. Each winding of the fluid treatment medium is positioned between a winding of the feed region and a winding of the permeate region. The spirally wound fluid treatment pack further has first and second opposite axial ends.

A feed fluid may be directed through the spirally wound fluid treatment pack along the feed region. For example, the windings of the feed region may fluidly open onto both axial ends of the spirally wound fluid treatment pack, while the windings of the permeate region may be fluidly isolated from, e.g., sealed at, each of the first and second axial ends. The feed fluid may then enter the windings of the feed region at one axial end, flow axially through the windings of the feed region along the feed surface of the fluid treatment medium to the opposite axial end, and exit the windings of the feed region at the opposite axial end. As the feed fluid passes axially through the windings of the feed region, a portion of the feed fluid, i.e., the permeate or filtrate, may pass generally radially through the windings of the fluid treatment medium to the windings of the permeate region. As the fluid flows along and/or through the fluid treatment medium, the fluid may be treated by the fluid treatment medium, and the permeate may be collected from the windings of the permeate region.

Fluid treatment arrangements and methods embodying one or more aspects of the invention may be used to treat fluids, including gases, liquids, or mixtures of gases, liquids, and/or solids, in any of a wide variety of ways. For many embodiments, the fluid treatment arrangements may be used in a separation process to separate one or more substances from the fluid. For example, the separation process may be a filtration process where a fluid is directed along and/or through the fluid treatment medium and substances in the fluid, e.g., solids or molecules above a certain size, are generally prevented from passing through the fluid treatment medium. Embodiments of the invention may be used in virtually all filtration processes, including microfiltration, ultrafiltration, nanofiltration, and reverse osmosis processes. As another example, the separation process may be a capture process where the fluid is directed along and/or through the fluid treatment medium and substances in the fluid, e.g., ions, molecules, proteins, nucleic acids, or other chemical substances, are chemically and/or physically bound to the fluid treatment medium. Some of the many specific applications for embodiments of the invention include dairy processing operations, such as casein concentration and milk serum protein concentration; beer and wine processing operations, such as filtration and clarification; and biotech operations, such as cell harvesting, cell lysate concentration, and protein separation.

SUMMARY OF THE INVENTION

In accordance with one aspect of the invention, fluid treatment arrangements may comprise a core assembly, a fluid treatment pack, and one or more control mechanisms. The core assembly has a longitudinal axis. The fluid treatment pack includes a fluid treatment medium which has a feed surface and an opposite permeate surface. The fluid treatment pack further includes a feed region and a permeate region. The feed region extends along the feed surface of the fluid treatment medium. The permeate region extends along the permeate surface of the fluid treatment medium. The fluid treatment pack is spirally wound around the core assembly and includes a plurality of windings of the feed region, a plurality of windings of the permeate region, and a plurality of windings of the fluid treatment medium. Each winding of the fluid treatment medium is positioned between a winding of the feed region and a winding of the permeate region. The spirally wound fluid treatment pack has a plurality of axially adjacent sections. The feed region of one section fluidly communicates with the feed region of an adjacent section and the permeate region of the section is fluidly isolated from the permeate region of the adjacent section. Each section of the spirally wound fluid treatment pack has a permeate port that extends generally radially through the plurality of windings of the feed region, the plurality of windings of the fluid treatment medium, and the plurality of windings of the permeate region. Each permeate port fluidly communicates with the windings of the permeate region and is fluidly isolated from the windings of the feed region. A control mechanism is fluidly coupled to the permeate region of at least one section to control a flow parameter, such as the transmembrane pressure or the permeate flux, in that section of the spirally wound fluid treatment pack.

In accordance with another aspect of the invention, methods for treating fluids may comprise passing a feed fluid axially through spiral windings of a feed region and along spiral windings of a fluid treatment medium, including directing feed fluid along a feed surface of the fluid treatment medium. The methods also comprise passing a portion of the feed fluid through the fluid treatment medium and along spiral windings of a permeate region, including directing permeate from a permeate surface of the fluid treatment medium into adjacent axial sections of the permeate region which are fluidly isolated from one another. The methods further comprise passing the permeate from the windings of the permeate region in each axial section into a permeate port that extends through the windings of the feed region, the windings of the fluid treatment medium, and the windings of the permeate region in the section. The methods additionally comprise passing permeate from a permeate port through a control mechanism fluidly coupled to the permeate port, including controlling a flow parameter in the permeate region of the corresponding section.

Embodiments of the invention provide many advantages. For example, by providing adjacent sections and a permeate port in each section of the spirally wound fluid treatment pack, the resistance to permeate flow from the permeate surface of the fluid treatment medium and along the permeate region is greatly reduced. Further, by controlling a flow parameter in the permeate region of one or more sections of the fluid treatment pack, a smaller variation in transmembrane pressure or permeate flux may be provided from section to section along the axial length of the fluid treatment pack. Consequently, embodiments of the invention are subject to less uneven fouling of the fluid treatment medium, enhanced throughput, and/or increased service life.

DESCRIPTION OF EMBODIMENTS

Figures 1, 2:
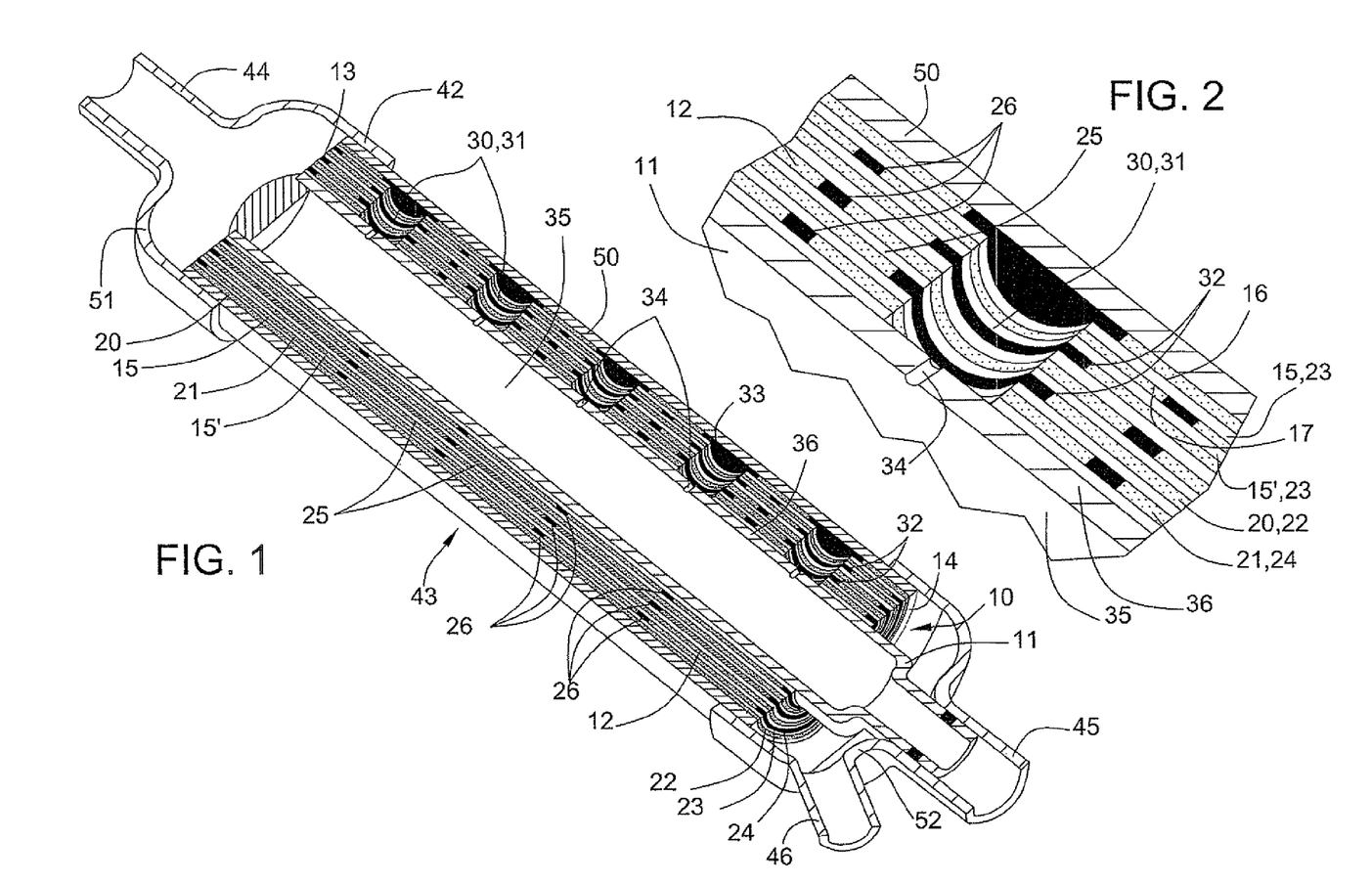
FIG. 1 is a sectioned oblique view of a fluid treatment assembly including a fluid treatment arrangement.
FIG. 2 is a sectioned view of a portion of the fluid treatment assembly of FIG. 1.

Fluid treatment arrangements embodying one or more aspects of the invention may be configured in numerous ways. One example of a fluid treatment arrangement 10 is shown in FIGS. 1 and 2, but fluid treatment arrangements embodying the invention are not limited to the fluid treatment arrangement 10 shown in FIGS. 1 and 2 or any of the other figures.

The fluid treatment arrangement 10 may include a core assembly 11 and a fluid treatment pack 12 spirally wound around the core assembly 11 to form a generally cylindrical structure having opposite axial ends 13, 14. The fluid treatment pack 12 may include a fluid treatment medium 15 having a feed surface 16 and a permeate surface 17. The fluid treatment pack 12 may further include a feed region 20 that extends along the feed surface 16 of the fluid treatment medium 15 and a permeate region 21 that extends along the permeate surface 17 of the fluid treatment medium 15. For many embodiments, the fluid treatment pack 12 may include a second fluid treatment medium 15' having a feed surface 16 and a permeate surface 17. The second fluid treatment medium 15' may be positioned in the fluid treatment pack 12 with a feed region 20 extending along the feed surface 16 of the second fluid treatment medium 15' and/or a permeate region 21 extending along the permeate surface 17 of the second fluid treatment medium 15'. For example, the feed region 20 may contact, and may or may not be bonded to, the feed surface 16 of each fluid treatment medium 15, 15', and/or the permeate region 21 may contact, and may or may not be bonded to, the permeate surface 17 of each fluid treatment medium 15, 15'. The multilayer composite of the fluid treatment pack may include one or more additional layers. For example, a cushioning layer, a bonding layer, or a drainage layer may extend between a fluid treatment medium and the feed region and/or the permeate region.

The fluid treatment medium 15, 15' may be fashioned from any of numerous materials, including, for example, a natural or synthetic polymer, a metal, or glass. The fluid treatment medium may be formed as any of a variety of permeable structures, including porous, permeable, semipermeable, or perm-selective structures. For example, the fluid treatment medium may comprise a permeable membrane, including a supported or unsupported membrane sheet; a permeable fibrous structure, including a woven or nonwoven fibrous sheet; a permeable metal sheet, including a permeable sintered fiber metal or powder metal sheet; or a permeable foam sheet. The fluid treatment medium may have, or may be modified to have, any of a myriad of treatment characteristics. For example, the fluid treatment medium may have any of a wide range of rejection characteristics for reverse osmosis separation or nanofiltration, molecular weight cutoffs for nanofiltration or ultrafiltration, or removal ratings for ultrafiltration or microfiltration. Further, the fluid treatment medium may have a positive, negative, or neutral electrical charge; it may be liquiphobic or liquiphilic, including, for example, hydrophobic or hydrophilic, or oleophobic or oleophilic; or it may include attached functional groups, such as ligands or any other reactive moiety, that can chemically bind to substances in the fluid. For many embodiments, the fluid treatment medium may comprise a permeable polymeric membrane.

The feed region 20 and the permeate region 21 may be structured in a wide variety of ways and may be similar to or different from one another. For example, either or both regions may comprise a porous sheet material formed, for example, from a natural or synthetic polymer and having an edgewise flow characteristic, e.g., an edgewise flow resistance, that facilitates the flow of fluid, e.g., feed fluid or permeate, edgewise within the sheet material parallel to the opposite major surfaces of the sheet material and along the feed surface or the permeate surface of the fluid treatment medium. For example, the sheet material may comprise a nonwoven fibrous sheet or it may comprise a netting, e.g., a mesh or screen, including a woven, extruded, expanded, and/or embossed netting having at least one set of ribs or strands, e.g., having two biplanar sets of ribs or strands. For many embodiments, porous the sheet material may comprise a polymeric netting available from DelStar Technologies, Inc., under the trade designation Naltex or Delnet. Generally, the porous sheet material of the feed region may be coarser, e.g., have larger openings, than the porous sheet material of the permeate region.

Alternatively, either or both of the feed region and the permeate region may comprise spacers and flow spaces formed by the spacers. These flow spaces may define open passageways which are substantially free of structure and which readily facilitate the flow of feed fluid through the feed region along the feed surface of the fluid treatment medium or permeate through the permeate region along the permeate surface of the fluid treatment medium. For example, the spacers may comprise spaced elongate structures, such as rods, that extend axially along the feed surface of the fluid treatment medium from one axial end to the opposite axial end of the spirally wound fluid treatment pack. Elongate flow spaces between the rods may be substantially free of structure and may define open channels that extend axially along the feed surface of the fluid treatment medium and fluidly communicate with both axial ends of the spirally wound fluid treatment pack. The volume occupied by the spacers may be much less than the volume of the flow spaces.

Other structures may be included in the feed region and/or the permeate region. For example, an adhesive material, including a hot-melt adhesive, a polyurethane, or an epoxy, or a non-adhesive material, including a thermoplastic polymer, that has a lower melting point than other components of the fluid treatment pack and can be melted and resolidified to form a bond, may be positioned in the permeate region to bond the permeate region to the permeate surface of one or both fluid treatment media. The adhesive material or the non-adhesive material may be applied to the permeate region in any of a variety of ways, including, for example, as ribs or dots.

The fluid treatment pack 12 is spirally wound around the core 11 to form a plurality of windings or turns, including a plurality of windings 22 of the feed region 20, a plurality of windings 23 of the fluid treatment medium 15, 15', and a plurality of windings 24 of the permeate region 21. Each winding 23 of a fluid treatment medium 15, 15' may be positioned between a winding 22 of the feed region 20 and a winding 24 of the permeate region 21. For many embodiments, each winding 22 of the feed region 20 may contact a winding 23 of a fluid treatment medium 15, 15' along the feed surface 16 of the fluid treatment medium 15, 15', and/or each winding 24 of the permeate region 21 may contact a winding 23 of a fluid treatment medium 15, 15' along the permeate surface 17 of the fluid treatment medium 15, 15'.

The spirally wound fluid treatment pack 12, as well as the core assembly 11, may have a generally circular cross section, as shown in FIG. 1, or any other desired cross section. The fluid treatment pack 12, including the feed region 20, the permeate region 21, and the fluid treatment medium 15, 15', may be sealed along the axially extending edges, for example, at the end of the innermost winding and the end of the outermost winding. The axially extending edges may be sealed in any of a variety of ways to prevent fluid flow into or out of the fluid treatment pack at the axially extending edges. For example, the axially extending edges may be fusion sealed by melting and resolidifying the edges of the fluid treatment medium 15, 15' and any porous sheet material in the feed region 20 and the permeate region 21. Alternatively, the axially extending edges may be sealed by bonding them with an adhesive material or a non-adhesive material as previously described. The adhesive material or the non-adhesive material may be suffused within and around any porous sheet material of the feed region or the permeate region and/or within and around the fluid treatment medium to form the seal. At the axial ends 13, 14, the spirally wound edges of each winding 24 of the permeate region 21, or each winding 23, 24 of the fluid treatment medium 15, 15' and the permeate region 21, may be similarly sealed to prevent fluid flow directly into or out of the permeate region 21. The spirally wound edges of each winding 22 of the feed region 20 may remain open at the axial ends 13, 14 of the fluid treatment pack 12. Fluid is then free to flow into or out of the axial ends 13, 14 of the fluid treatment pack 12 via the windings 22 of the feed region 20. However, fluid is prevented from flowing into or out of the windings 23 of the permeate region 21, or the windings 23, 24 of the fluid treatment medium 15, 15' and the permeate region 21, at the axial ends 13, 14 of the spirally wound fluid treatment pack 12.

The fluid treatment pack 12 further includes a plurality of axially adjacent sections 25, each section 25 comprising a plurality of windings 22 of the feed region 20, a plurality of windings 23 of the fluid treatment medium 15, 15', and a plurality of windings 24 of the permeate region 21. The sections 25 may be formed in a variety of ways. For example, a plurality of barriers 26 may extend within the fluid treatment pack 12 to define the sections 25. The barriers 26 may be evenly spaced axially to define axial sections 25 having equal lengths or unevenly spaced axially to define axial sections having unequal lengths. The axial lengths of the sections, e.g., the spacing between adjacent barriers, may be in the range from about one centimeter or less to about 100 centimeters or more. For some embodiments, the axial lengths of the sections may be in the range from about 10 centimeters to about 20 centimeters. Each barrier 26 may extend within the permeate region 21, or within the permeate region 21 and the fluid treatment medium 15, 15', in, for example, a generally radial plane, extending perpendicular to the axis of the fluid treatment pack 12. The barrier 26 may then spiral outwardly along at least the windings 24 of the permeate region 21 from the inner axial edge to the outer axial edge of the fluid treatment pack 12.

Each barrier 26 may be fashioned in any of numerous ways. For example, each barrier 26 may comprise a generally spirally extending bead, including a band or strip, of an adhesive material or non-adhesive material within the permeate region 21. The adhesive material or the non-adhesive material may be suffused within any porous sheet material of the permeate region, or the porous sheet material may be trimmed to miss the bead. The bead may contact and seal against, or within, the fluid treatment media 15, 15' facing the permeate region 21. For many embodiments, the bead of adhesive material or non-adhesive material forming the barrier 26 may not extend into the feed region 20. Alternatively, the barrier may comprise a bead formed by melting and resolidifying any porous sheet material in the permeate region, or the porous sheet material in the permeate region and the fluid treatment media. Again, for many embodiments, the bead may not include any porous sheet material in the feed region. Each barrier 26 fluidly isolates the permeate regions 21 of adjacent sections 25, but the feed regions 20 of adjacent sections 25 may fluidly communicate with one another. For many embodiments, the feed region 20 may extend continuously through all of the axial sections 25.

The fluid treatment pack 12 further includes a plurality of permeate ports 30 that may extend generally radially through the fluid treatment pack 12. For many embodiments, all of the axial sections 25 of the fluid treatment pack 12 have at least one permeate port 30 extending generally radially through each section 25. Each axial section may have two or more permeate ports angularly spaced, e.g., equally angularly spaced, around the axial section. Each permeate port 30 may be located near the middle of the axial section 25 or may be located closer to, or proximate to, one or the other of the two barriers 26 defining the axial section 25. Each permeate port 30 may extend through most, e.g., at least about 75%, or substantially all, e.g., at least about 90%, of the windings 22 of the feed region 20, the windings 23 of the fluid treatment medium 15, 15', and the windings 24 of the permeate region 21 of the fluid treatment pack 12. For many embodiments, each permeate port 30 may extend through all of the windings 22, 23, 24 from the innermost winding 22, 23, 24, of the feed region 20, fluid treatment medium 15, 15', and permeate region 21 to the outermost winding 22, 23, 24 of the feed region 20, fluid treatment medium 15, 15', and permeate region 21.

The permeate ports 30 may be configured in a wide variety of ways to isolate each permeate port 30 from the windings 22 of the feed region 20, or the windings 22, 23 of the feed region 20 and the fluid treatment medium 15, 15', while allowing the permeate port 30 to fluidly communicate with the windings 24 of the permeate region 21, or the windings 23, 24 of the fluid treatment medium 15, 15' and the permeate region 21. For example, a permeate port 30 may be defined by a series of generally radially aligned holes in successive windings 22, 23, 24 of the porous sheet material in the feed region 20, the fluid treatment medium 15, 15', and the porous sheet material in the permeate region 21, creating a generally radially extending bore 31. The bore 31 may have a constant lateral dimension, e.g., diameter, along its length or a varying lateral dimension along its length. Alternatively, the feed region and/or the permeate region may comprise a porous sheet material that is very open, i.e., has a low resistance to fluid flow through the sheet material from one major surface to the other. No holes may then be formed in the open sheet material of the successive windings of the feed region and/or the permeate region, while holes may be formed in the successive windings of the fluid treatment medium. The permeate port may then comprise a series of generally radially aligned holes in successive windings of the fluid treatment medium interleaved with layers of open sheet material of successive windings of the feed region and/or the permeate region.

The windings 24 of the permeate region 21, or the windings 23, 24 of the fluid treatment medium 15, 15' and the permeate region 21, may fluidly communicate with each permeate port 30 in each section 25 in a variety of ways. For example, the windings 24 of the porous sheet material of the permeate region 21 may extend through, and open within, the permeate port 30 or may extend to the periphery of the permeate port 30 with the edge of the porous sheet material opening into the port 30, e.g., the bore 31. Similarly, the windings 23 of the fluid treatment medium 15, 15' may extend to the periphery of the permeate port 30, e.g., the bore 31, with the edge of the fluid treatment medium 15, 15' opening onto, or sealed from, the port 30.

The windings 22 of the feed region 20, or the windings 22, 23 of the feed region 20 and the fluid treatment medium 15, 15', may be sealed from each permeate port 30 in each section 25 in a variety of ways. For example, a seal 32, e.g., a generally annular seal, may be formed by fusion sealing any porous sheet material in the feed region 20 of each winding 22, or the porous sheet material in the feed region 20 and the fluid treatment medium 15, 15' of each winding 22, 23, around the periphery of the permeate port 30, e.g., the bore 31. Alternatively, the seal 32 may be formed by an adhesive material or a non-adhesive material positioned in the feed region 20 of each winding 22 around the periphery of the permeate port 30, e.g., the bore 31. The adhesive or non-adhesive material may contact and seal against, or within, the fluid treatment medium 15, 15'. The adhesive or non-adhesive material may be suffused within any porous sheet material of the feed region 20 or the porous sheet material may be trimmed to miss the adhesive or non-adhesive material.

The permeate ports 30 may serve as permeate outlets for the permeate regions 21 in the axial sections 25 and each may open onto the inner periphery of the fluid treatment pack 12 and/or the outer periphery of the fluid treatment pack 12. For example, in the embodiment of FIG. 1, the permeate ports 30 open at one end onto the inner periphery of the fluid treatment pack 12 and fluidly communicate with the core assembly 11. At the other end, the permeate ports 30 may be capped at the outer periphery of the fluid treatment pack by a cap 33, isolating the permeate ports 30 from the exterior of the fluid treatment pack 12. Alternatively, the permeate ports may be capped at the inner periphery of the fluid treatment pack and may open onto the outer periphery of the fluid treatment pack, or may open onto both the inner and outer peripheries of the fluid treatment pack.

The fluid treatment arrangement 10 further includes one or more control mechanisms 34 operatively associated with the permeate region 21 of at least one of the axial sections 25 of the fluid treatment pack 12 to control one or more flow parameters in that section 25. A control mechanism 34 may be fluidly coupled to the permeate region 21 in only one section 25 to control a flow parameter in that section 25. Alternatively, a control mechanism may be fluidly coupled to the permeate regions in a group of two or more sections to control a flow parameter in that group of sections. For many embodiments, the fluid treatment arrangement 10 includes a plurality of control mechanisms 34, and most or all of the permeate ports 30 are fluidly coupled to a control mechanism 34 to control a flow parameter in the permeate region 21 of the corresponding section 25. For example, each control mechanism 34 may be fluidly coupled to one and only one permeate port 30 to control a flow parameter in the permeate region 21 of the corresponding section 25. The flow parameters controlled by the control mechanisms may include, for example, the permeate flux through the fluid treatment medium, the transmembrane pressure, and/or the resistance to permeate flow within the permeate region.

The control mechanisms may be variously configured. For example, a control mechanism may comprise a restricted opening, including a fixed or variable orifice or capillary. In the embodiment of FIG. 1, each control mechanism 34 may comprise a fixed capillary. A control mechanism may also comprise a valve, including an adjustable or variable valve. The control mechanisms may be identical to or different from one another. For many embodiments, the control mechanisms may be configured to provide a predetermined relationship among the flow parameters from one axial section or group of sections to another. For example, the control mechanisms may be configured to provide permeate fluxes through the fluid treatment media in all of the sections that are similar to, including substantially equal to, one another.

The control mechanisms may be fluidly coupled to the permeate regions in the axial sections in a variety of ways. For example, the control mechanisms may fluidly communicate with the permeate regions via open inner ends of the permeate ports. The control mechanisms may then be physically associated with the core assembly, and the core assembly may be configured in many different ways to accommodate the control mechanisms.

For example, as shown in FIG. 1, the core assembly 11 may include a longitudinal flow passage 35. The longitudinal flow passage 35 may have a constant or varying diameter, may be closed at one axial end and open at the other axial end, and may be the only longitudinal flow passage 35 in the core assembly 11 fluidly coupled to a permeate port 30. The open inner ends of the permeate ports 30 may be sealed against the exterior of the wall 36 of the core assembly 11, for example, by an adhesive or non-adhesive material. The control mechanisms 34, e.g., fixed capillaries, may be mounted in the wall 36 of the core assembly 11. For example, a control mechanism 34 may be fluidly coupled between the open inner end of each permeate port 30 and the sole longitudinal passage 35. Each control mechanism 34 then fluidly communicates with the permeate region 21 in only one axial section 25 of the fluid treatment pack 12 via a permeate port 30, the control mechanism 34 controlling one or more flow parameters in the permeate region 21 of the axial section 25.

Figure 3:
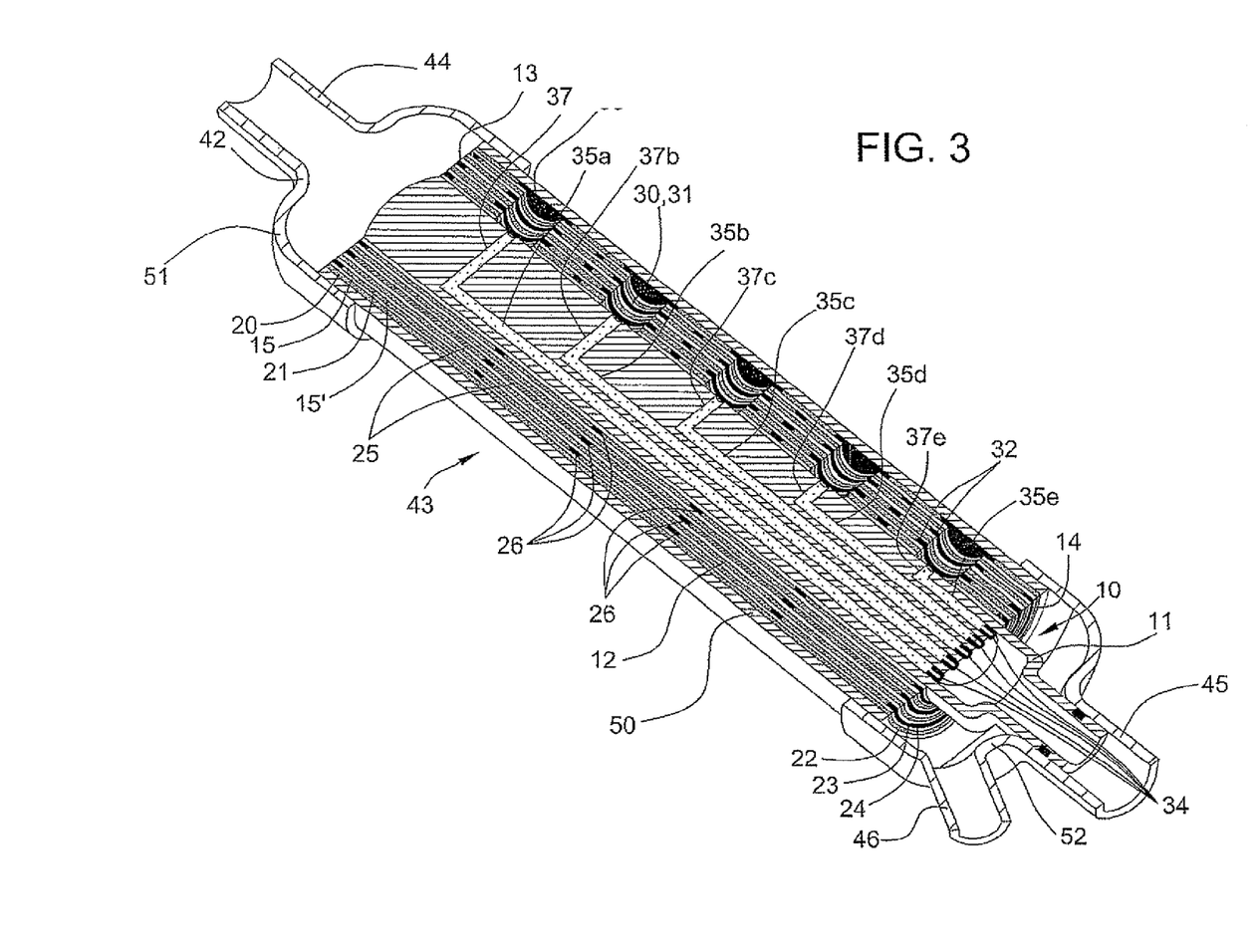
FIG. 3 is a sectioned oblique view of another fluid treatment assembly

Another example of a plurality of control mechanisms 34 physically associated with the core assembly 11 is shown in FIG. 3. The core assembly may include a plurality of flow passages, each fluidly coupled to a permeate port and fluidly isolated from one another. For example, the core assembly 11 may include a plurality of longitudinal flow passages, e.g., five longitudinal flow passages 35a-35e. The longitudinal flow passages may be fluidly isolated from one another and may all open onto the same axial end of the core assembly 11. The core assembly 11 may further include a plurality of generally radial flow passages 37a-37e. The open inner end of each permeate port 30 may be sealed against the exterior of the core assembly 11, and a radial passage 37a-37e may extend through the core assembly 11 between the open inner end of a permeate port 30 and one of the longitudinal flow passages 35a-35e. The control mechanisms 34 may be positioned in the longitudinal flow passages 35a-35e. For example, a control mechanism 34, e.g., a fixed capillary, may be positioned at the end of each longitudinal flow passage 35a-35e. Each control mechanism 34 then fluidly communicates with the permeate region 21 in only one axial section 25 of the fluid treatment pack 12 via a permeate port 30, a radial passage 37a-37e, and a longitudinal flow passage 35a-35e, the control mechanism 34 controlling one or more flow parameters in the axial section 25.

Yet another example may be similar to the example of FIG. 3. However, the core assembly may include fewer longitudinal flow passages. At least two radial passages may be fluidly coupled between one of the longitudinal flow passages and the open inner ends of at least two permeate ports, each in a different axial section. The control mechanism in the single longitudinal flow passage then fluidly communicates with the permeate region in each of a group of axial sections and controls one or more flow parameters in the permeate region of each section.

Figure 4:
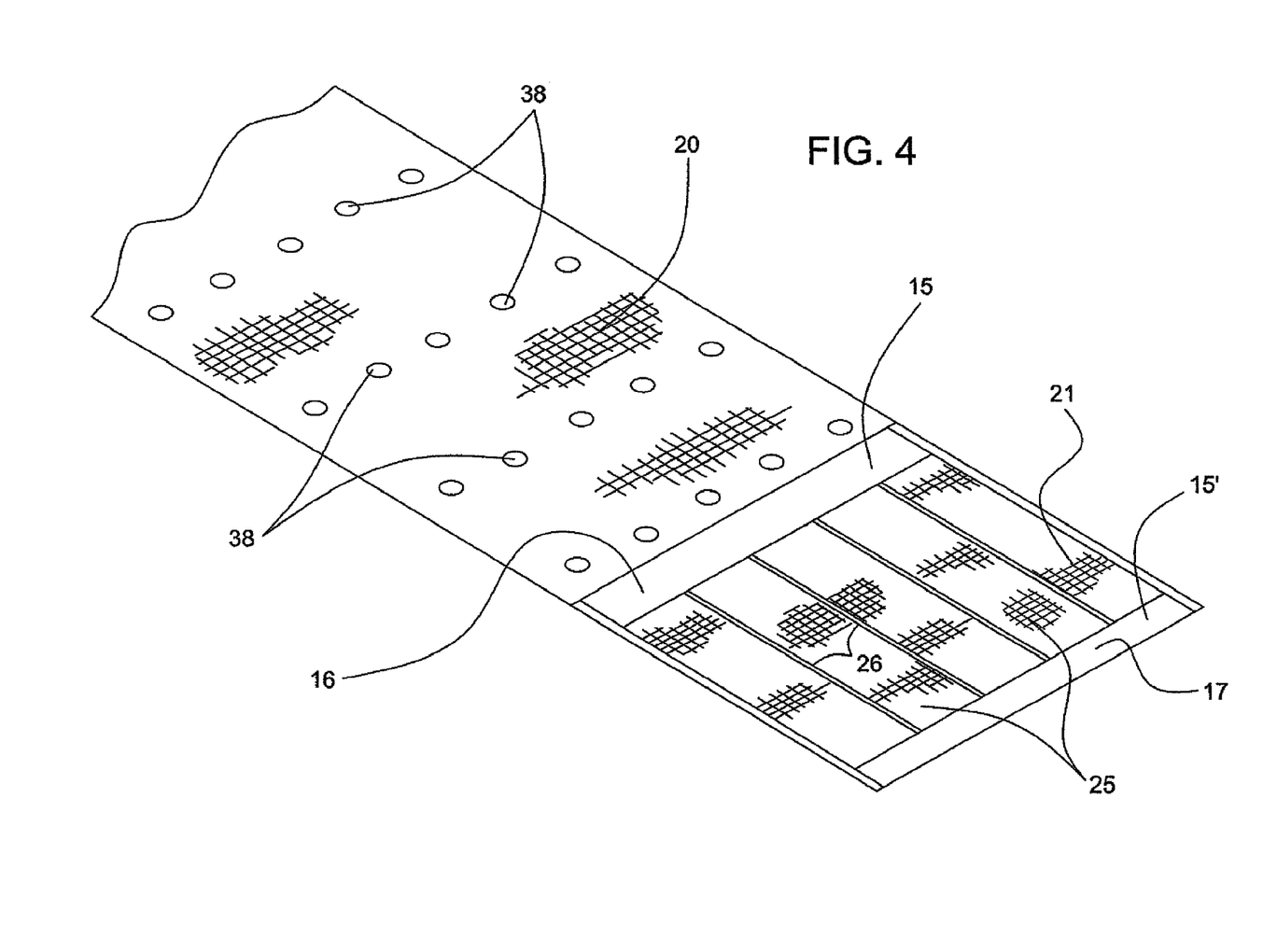
FIG. 4 is an oblique view of a composite of a fluid treatment pack.

A fluid treatment arrangement 10 may be made in many different ways. For example, as shown in FIG. 4, a composite of the fluid treatment pack 12 may include a porous sheet material of the feed region 20, one or more fluid treatment media 15, 15' and a porous sheet material of the permeate region 21. A seal may be applied along both side edges of the permeate region sheet 21, or the permeate region 21 and the fluid treatment media 15, 15'. In addition, generally linear beads forming the barriers 26 may be applied along the permeate region 21 at spaced locations parallel to the side edges. The spacing between the barrier beads may be uniform or non-uniform, and the distance between the barrier beads, which corresponds to the axial length of an axial section, may be established according to various factors. These factors include, for example, the characteristics of the feed fluid, such as viscosity and the nature, e.g., size, shape, and/or amount, of any suspended particulates, and the desired operating parameters, such as crossflow shear stress and pressure drop. Generally, a higher desired crossflow shear stress may suggest a shorter distance between the barrier beads, and a shorter axial length for the corresponding axial section, to lessen any variation in transmembrane pressure along the axial section. Generally, the distances between the barrier beads, and the axial lengths of the corresponding axial sections, may be in the range from about one centimeter or less to about 100 centimeters or more, as previously described.

For example, a liquid adhesive may be applied along the side edges in the permeate region 21 and may be pressed between the fluid treatment media 15, 15'. Similarly, liquid adhesive barrier beads may be applied in parallel lines between the side edges in the permeate region 21 and may be pressed between the fluid treatment media 15, 15'. The liquid adhesive may suffuse into the porous sheet material of the permeate region 21, or the porous sheet material may be trimmed to miss the liquid adhesive. The liquid adhesive may extend between and contact the facing permeate surfaces 17 of the fluid treatment media 15, 15'. While the liquid adhesive may also suffuse into the fluid treatment media 15, 15', for many embodiments, the liquid adhesive may not extend into the feed region 20. The liquid adhesive is allowed to set, for example, after the composite is spirally wound, forming the edge seals along the windings 24 of the permeate region 21 at both axial ends 13, 14 of the fluid treatment pack 12 and the barriers 26 within the windings 24 of the permeate region 21 that define the axial sections 25 of the fluid treatment pack 12.

Alternatively, a non-adhesive material, such as a thermoplastic polymer, that has a lower melting point than the fluid treatment media or the porous sheet material of the feed and permeate regions may be positioned along the side edges and in spaced parallel lines between the side edges of the permeate region. The porous sheet material of the permeate region may or may not be trimmed to miss the non-adhesive material. The non-adhesive material may be pressed between the fluid treatment media, and the non-adhesive material, along with the fluid treatment media and the porous sheet material of the permeate region, may be heated, for example, with hot air, melting the non-adhesive material. If the porous sheet material of the permeate region is not trimmed, the melted non-adhesive material may suffuse into the porous sheet material. The melted non-adhesive material may extend between and contact the facing permeate surfaces of the fluid treatment media and may suffuse into the fluid treatment media. For many embodiments, the melted non-adhesive material may not extend into the feed region. The melted non-adhesive material is allowed to resolidify between the fluid treatment media in contact with and bonded to the facing permeate surfaces of the fluid treatment media, for example, after the composite is spirally wound, forming the edge seals along the windings of the permeate region at both of the axial ends of the fluid treatment pack and the barriers within the windings of the permeate region that define the axial sections of the fluid treatment pack.

As yet another alternative, the side edge seals and the barrier beads in the permeate region may be formed by fusion sealing. For example, the fluid treatment media and the porous sheet material of the permeate region may be melted together and resolidified at the side edges and along spaced parallel lines between the side edges, forming the edge seals and the barriers.

The edges at the longitudinal ends of the composite, including the edges of the feed region 20, the fluid treatment media 15, 15', and the permeate region 21, may also be sealed, for example, by an adhesive material, a non-adhesive material, or a fusion seal as previously described.

A series of seals for defining the permeate ports 30 may be formed in the feed region 20. For example, a plurality of areas 38, e.g., generally circular areas or generally annular areas, of a liquid adhesive may be applied within the feed region 20 between each adjacent pair of barrier beads and in each axial section 25 of the fluid treatment pack 12. The areas 38 of liquid adhesive in each section 25 may be longitudinally aligned along the composite and longitudinally spaced from one another a distance that will cause the areas to form a generally radial stack when the composite is spirally wound around the core assembly 11. The areas 38 of liquid adhesive may be staggered or aligned laterally along the composite from section 25 to section 25, where the lateral or side edge-to-side edge direction of the composite corresponds to the axial direction of the spirally wound fluid treatment pack. Each area may alternatively comprise a laterally extending strip or band of liquid adhesive applied to the feed region in lieu of a plurality of laterally aligned circles. The liquid adhesive may suffuse the porous sheet material of the feed region 20 or the porous sheet material may be trimmed to miss the areas 38 of liquid adhesive. The areas 38 of liquid adhesive may be pressed between the fluid treatment media 15, 15' with the liquid adhesive extending between and contacting the facing feed surfaces 16 of the fluid treatment media 15, 15'. While the liquid adhesive may suffuse into the fluid treatment media 15, 15', for many embodiments, the liquid adhesive may not extend into the permeate region 21. The liquid adhesive is allowed to set, for example, after the composite is spirally wound. Holes which are smaller than areas 38 may then be drilled through the radially stacked areas 38 of solidified adhesive in each section 25 from the outer windings 22, 23, 24 to the inner windings 22, 23, 24 of the feed region 20, the fluid treatment media 15, 15', and the permeate region 21, forming a permeate port 30 in each section 25 of the fluid treatment pack 12. Alternatively, holes may be formed in the fluid treatment media or in the fluid treatment media and the porous sheet material of the feed region and/or the permeate region, either after or before the liquid adhesive is applied to the feed region. The permeate ports 30 are sealed from the feed region 20 by the remaining solidified adhesive in each winding 22 which encircles the port 30.

Alternatively, the seals for defining the permeate ports may be formed by positioning a non-adhesive material in the feed region in locations similar to those described for the adhesive material. The non-adhesive material may then be melted, suffused within any porous sheet material of the feed region 20, and resolidified, and the composite may be spirally wound to form the radially stacked areas of the non-adhesive material. The holes may be formed in the radially stacked areas as previously described, creating a permeate port in each axial section of the fluid treatment pack.

As yet another alternative, the seals defining the permeate ports may be formed by fusion sealing. For example, the fluid treatment media and the porous sheet material of the feed region may be melted together and resolidified to define the areas or bands that are radially stacked when the composite is spirally wound. The holes may then be formed as previously described, creating a permeate port in each axial section of the fluid treatment pack.

Figure 5:
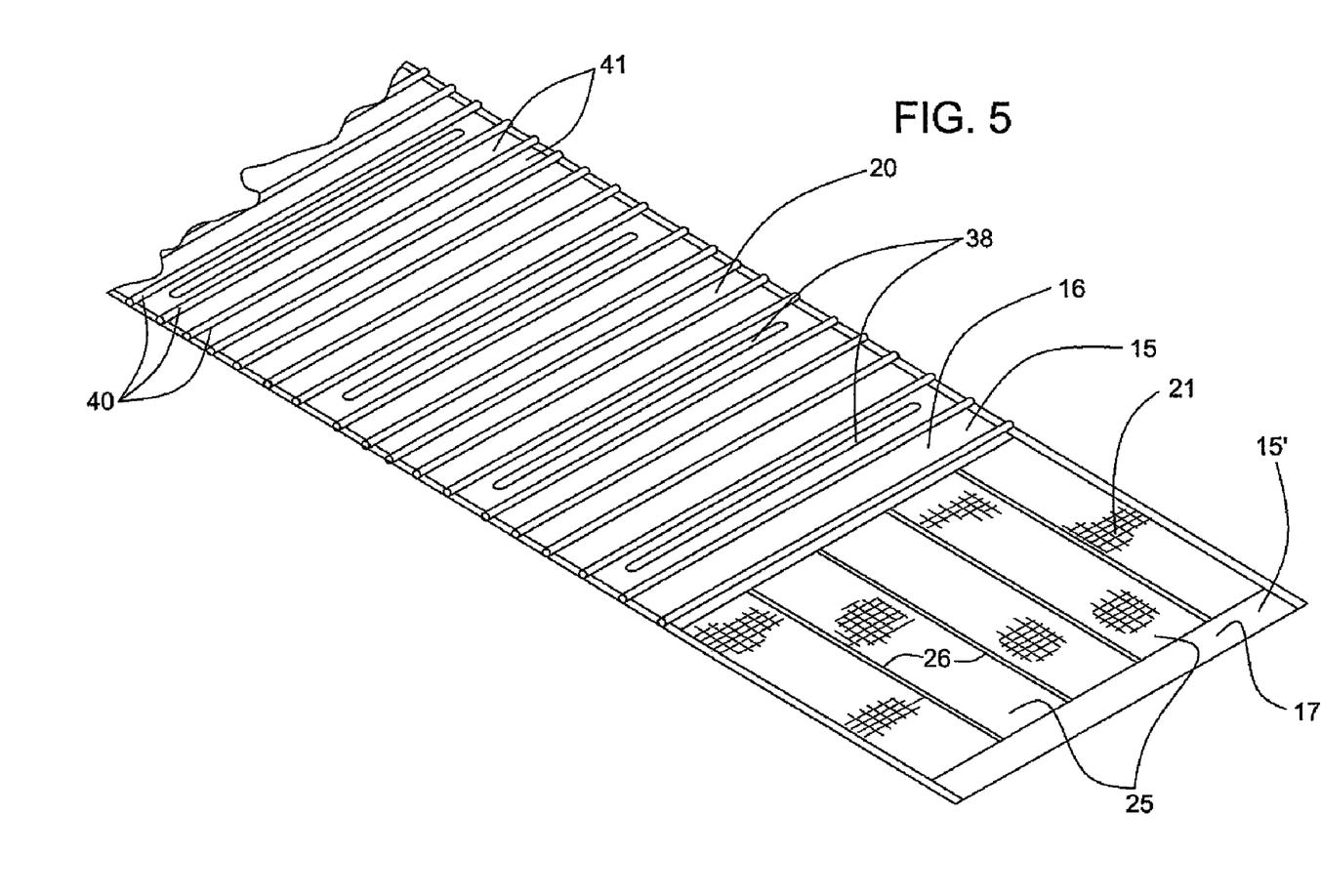
FIG. 5 is an oblique view of a composite of another fluid treatment pack.

Fluid treatment packs having spacers and flow spaces may be made in a similar manner. For example, as shown in FIG. 5, spacers such as elongate structures 40 may extend laterally along the composite in the feed region 20 across the axial sections 25 and may be bonded to the feed surface 16 of at least one fluid treatment medium 15, 15' facing the feed region 20. The elongate structures 40 may be spaced longitudinally along the composite to define a series of flow spaces 41 that extend between the side edges of the composite. Most of the flow spaces 41 may be substantially free of structure. Some of the flow spaces 41 may include the areas 38, for example, bands of adhesive material or non-adhesive material that extend laterally across the axial sections 25. The areas 38 may have a height which corresponds to the height of the spacers 40. When the composite is spirally wound around the core assembly 11, the elongate structures 40 and the flow spaces 41 in the feed region 20 may extend between the axial ends 13, 14 of the fluid treatment pack 12, and the areas 38 of adhesive or non-adhesive material may be radially stacked on one another. Holes may be formed in the radially stacked areas 38 as previously described, creating a permeate port 30 in each axial section 25.

One or more control mechanisms 34 may be mounted to the core assembly 11. For example, capillaries may be formed in the wall 36 of the core assembly 11 or at the ends of the isolated longitudinal flow passages 35a-35e. The core assembly may include one or more radial steps which extend axially along the exterior of the core assembly. A radial step may have a height similar to the thickness of the composite, and the sealed longitudinal edge of the composite, i.e., the axially extending edge of the fluid treatment pack, may be secured to the core assembly against the step in a variety of ways. Alternatively, each of two or more radial steps may have a height similar to the thickness of the feed region, the fluid treatment medium, or the permeate region, each of which may be secured to a different step. The composite may then be spirally wound around the core assembly 11, for example, with the second fluid treatment medium 15' immediately adjacent to, e.g., contacting, the exterior of the core assembly 11 and the feed region 20 facing away from the core assembly 11. Alternatively, the composite may be spirally wound around the core assembly with the feed region immediately adjacent to, e.g., contacting, the core assembly. At the interface between each control mechanism 34 or passage 37a-37e in the exterior of the core assembly 11 and the locations on the composite of the open inner ends of the permeate ports 30, the composite may be sealed to the core assembly 11, for example, by an adhesive or non-adhesive material, to fluidly isolate the control mechanism 34 from the feed fluid. Once the composite has been sealed to and wound around the exterior of the core assembly 11, the composite may continue to be spirally wound on itself to form the plurality of windings 22, 23, 24 of the feed region 20, the fluid treatment media 15, 15', and the permeate region 21 of the fluid treatment pack 12. The fluid treatment pack 12 may have a radius of up to about 1 inch or up to about 3 inches or up to about 6 inches or up to about 10 inches or more. After the composite has been fully wound around the core assembly 11 to form the fluid treatment pack 12, the holes may be drilled to form the permeate ports 30 in each axial section 25, as previously described, and the exterior of each permeate port 30 may be sealed with an impermeable cap 33.

After a fluid treatment arrangement is formed, it may be contained within a variety of housings to provide a fluid treatment assembly. The fluid treatment assembly may comprise a housing containing only a single fluid treatment arrangement. Alternatively, the housing may contain multiple fluid treatment arrangements arranged serially or in parallel within the housing. The housing may permanently contain a fluid treatment arrangement, e.g., forming a disposable fluid treatment assembly, or the housing may removably contain the fluid treatment arrangement, allowing a used fluid treatment arrangement to be replaced by a new or cleaned fluid treatment arrangement in a reusable housing.

The housing may be formed from any impermeable material, e.g., a metallic material or a polymeric material, which is compatible with the process parameters, e.g., the pressure and temperature and chemical composition of the fluid being treated. As shown in FIG. 1, the housing 42 of a fluid treatment assembly 43 may have three or more ports, e.g., a process or feed fluid inlet port 44, a permeate or filtrate outlet port 45, and a retentate or concentrate outlet port 46. The housing may have additional ports, including, for example, one or more ports associated with draining, venting, or cleaning. The ports may be situated on the housing in any of numerous configurations, including an in-line configuration, and the ports may comprise any of a wide variety of fittings. The housing may define fluid flow paths between the ports, and the fluid treatment arrangement may be positioned in the housing in the fluid flow paths. For example, the fluid treatment arrangement 10 may be positioned in the housing 42 with the windings 22 of the feed region 20 in one fluid flow path between the feed inlet port 44 and the retentate outlet port 46 and with the windings 22 of the feed region 22, the windings 23 of the fluid treatment medium 15, 15', the windings 24 of the permeate region 21, the permeate ports 30, the control mechanisms 34, and the passage(s) 35, 37 in the core assembly 11 in another fluid flow path between the feed inlet port 44 and the permeate outlet port 45.

One of many examples of a housing 42 is shown in FIG. 1. The housing 42 may include a shell 50, e.g., a generally cylindrical shell, an inlet piece 51 sealed to one end of the shell 50, and an outlet piece 52 sealed to the opposite end of the shell 50. The inlet piece 51 may include the feed inlet port 44, and the outlet piece 52 may include the permeate outlet port 45 and the retentate outlet port 46. The fluid treatment arrangement 10 may be tightly fitted within the shell 50, for example, with the outermost winding 22 of the feed region 20 pressing against the interior of the shell 50 to prevent feed fluid from bypassing the fluid treatment arrangement 10. Alternatively, the fluid treatment arrangement may be sealed against the interior of the shell by an adhesive or non-adhesive material, or the fluid treatment arrangement may be covered with an impermeable wrap or a porous wrap that extends between the exterior of the fluid treatment arrangement and the interior of the shell. The fluid treatment arrangement 10 may be longitudinally secured within the shell 50, for example, by a spider at one or both ends of the shell. The windings 22 of the feed region 20 at one axial end 13 of the fluid treatment pack 12 fluidly communicate with the feed inlet port 44 in the housing 42, and the windings 22 of the feed region 20 at the opposite axial end 14 of the fluid treatment pack 12 fluidly communicate with the retentate outlet port 46 in the housing 42. The fluid treatment arrangement 10 may be secured within the housing 42 with the open end of the longitudinal passage(s) 35 of the core assembly 11 sealed within the permeate outlet port 45 in the housing 42.

Fluid may be treated in any of numerous ways by fluid treatment assemblies and arrangements embodying the invention. In one mode of operation, a feed fluid may be directed into the spiral windings of the feed region of the fluid treatment pack. For example, feed fluid may be passed through the feed inlet port 44 into the inlet piece 51 of the housing 42. From the inlet piece 51, the feed fluid may enter the spiral windings 22 of the feed region 20 at the feed end 13 of the fluid treatment pack 12. The feed fluid is prevented from entering the permeate region 21 by the seals along the edges of the spiral windings 24 of the permeate region 21. From the feed end 13 of the fluid treatment pack 12, the feed fluid may flow axially through the windings 22 of the feed region 20 and along the windings 23 of the fluid treatment media 15, 15' to the retentate end 14 of the fluid treatment pack 12. For example, the feed fluid may flow edgewise through the porous sheet material of the feed region 20, or axially along the flow spaces substantially free of structure, from the feed end 13 to the retentate end 14. As the feed fluid flows axially through the feed region 20, it flows tangentially along the feed surface 16 of the fluid treatment media 15, 15' and may generate shear on the feed surface 16 along all of the axial sections 25 from the feed end 13 to the retentate end 14. From the retentate end 14 of the fluid treatment pack 12, the feed fluid passes as retentate into the outlet piece 52 of the housing 42 and out of the housing 42 via the retentate outlet port 46.

As the feed fluid passes along the feed surface 16 of the fluid treatment media 15, 15', a portion of the feed fluid passes as permeate through the fluid treatment media 15, 15', where the fluid may be treated in any of a wide variety of ways. The permeate may pass from the permeate surface 17 of the fluid treatment media 15, 15' into and along the spiral windings 24 of the permeate region 21 in each axial section 25 of the fluid treatment pack 12. The permeate is prevented from passing along the permeate region 21 between adjacent axial sections 25 by the barriers 26, fluidly isolating the permeate regions 21 in adjacent sections 25 from one another. The permeate may pass axially and/or circumferentially along the windings 24 of the permeate region 21, e.g., edgewise along the porous sheet material of the permeate region 21, in each section 25 to the permeate port 30 in the section 25.

From at least one permeate port of the fluid treatment pack, the permeate may pass through a control mechanism fluidly coupled to the permeate port to control a flow parameter in the permeate region of the corresponding axial section. For many embodiments, the permeate may pass from each permeate port through a control mechanism fluidly coupled to the permeate port to control a flow parameter in the permeate region of the corresponding axial section. For example, the permeate may pass inwardly along each permeate port 30 in each axial section 25 through the open inner end of the permeate port 30, through the control mechanism 34 in the wall 36 of the core assembly 11 which is fluidly coupled to the permeate port 30, and into the longitudinal passage 35 in the core assembly 11, as shown in FIG. 1. From the longitudinal passage 35 in the core assembly 11, the permeate may exit the housing 42 via the permeate outlet port 45 in the outlet piece 52 of the housing 42. Alternatively, as shown in FIG. 3, the permeate may pass inwardly along each permeate port 30 in each axial section 25 through the open inner end of the permeate port 30 into the radial flow passage 37a-37e and the longitudinal flow passage 35a-35e of the core assembly 11 and through the control mechanism 34 fluidly coupled to the permeate port 30 at the end of longitudinal flow passage 35a-35e. From the control mechanism 34, the permeate from all of the permeate ports 30 may exit the housing 32 via the permeate outlet port 45 in the outlet piece 52 of the housing 42.

Figure 6:
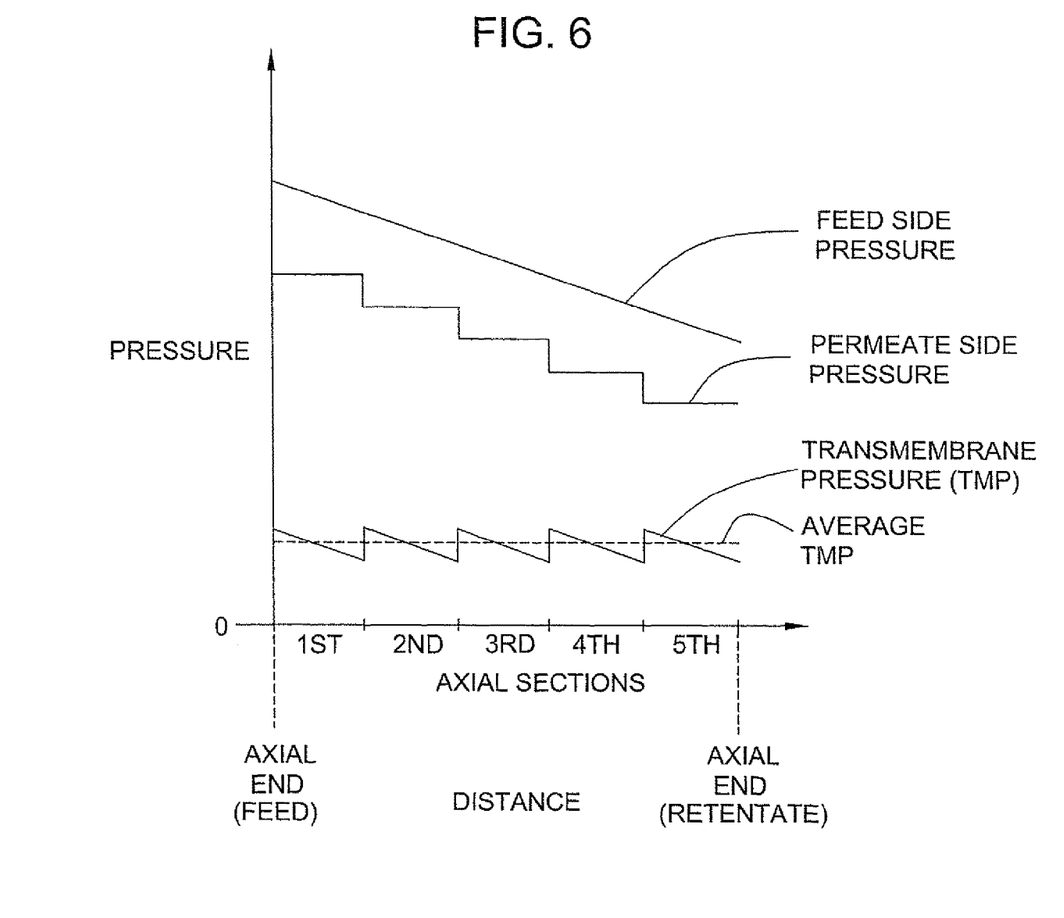
FIG. 6 is a graph of the transmembrane pressure in a fluid treatment arrangement.

The control mechanisms may control the flow parameters in one or more of the axial sections in a variety of ways. For many embodiments, the control mechanisms may be arranged to provide a predetermined relationship of the flow parameters from one axial section to another within the fluid treatment arrangement. For example, the feed fluid may enter the windings 22 of the feed region 20 at the feed end 13 of the fluid treatment pack 12 at a first pressure and may exit the windings 22 of the feed region 20 at the retentate end 14 at a second lower pressure, as shown in FIG. 6. The pressure of the feed fluid within the windings 22 of the feed region 20 may progressively decrease, e.g., linearly, from the feed end 13 to the retentate end 14. The control mechanisms 34 may, for example, be arranged to provide similar permeate fluxes in the axial sections 25 even though the feed pressure progressively decreases from section 25 to section 25. For example, the control mechanisms 34 may be arranged so that the permeate flux in each section 25 of the fluid treatment pack 12 may be no greater than about 5 times or no greater than about 2 times or no greater than about 1.5 times the average of the permeate flux in all of the sections. The permeate flux may even be substantially the same in each axial section 25 of the fluid treatment pack 12. For some embodiments, the control mechanisms may progressively differ from one another, e.g., capillaries that progressively differ in length and/or diameter of the capillary, to successively restrict permeate flow through the capillary decreasingly in adjacent sections 25 from the feed end 13 to the retentate end 14 of the fluid treatment pack 12, as shown in FIG. 6. The resulting transmembrane pressure within each section, and the corresponding permeate flux, may then remain similar, including substantially the same, from section 25 to section 25 within the fluid treatment pack 12. The control mechanisms may be arranged, e.g., capillaries may be sized, to provide this predetermined relationship in accordance with many factors, including the difference between the first and second pressures, i.e., the crossflow pressure drop, the upstream crossflow shear stress, the viscosity and velocity of the feed fluid and/or the permeate, and the amount of fouling of the fluid treatment medium.

Many advantages are associated with fluid treatment assemblies, arrangements, and methods embodying one or more aspects of the invention. For example, by providing adjacent axial sections 25 and at least one permeate port 30 in each section 25 of the spirally wound fluid treatment pack 12, the resistance to permeate flow from the permeate surface 17 of the fluid treatment media 15, 15' is greatly reduced. The permeate needn't spiral inwardly, or outwardly, along all of the windings 24 of the permeate region 21 but may merely pass axially and/or circumferentially along one winding 24 to the permeate port 30. Further, by controlling the flow parameters in the axial sections 25 of the fluid treatment pack 12, various beneficial predetermined relationships of the flow parameters, including smaller variations in transmembrane pressure and permeate flux from section to section, may be provided by the fluid treatment arrangement. Reducing these variations leads to less uneven fouling of the fluid treatment medium, enhanced throughput, and/or increased service life.

While various aspects of the invention have been previously described and/or illustrated with respect to several embodiments, the invention is not limited to these embodiments. For instance, one or more features of the invention may be eliminated or modified without departing from the scope of the invention. For example, the control mechanisms may be fluidly coupled to the permeate ports external to the fluid treatment assembly. For some embodiments, the isolated flow passages in the core assembly may be extended to the end of the permeate outlet port and fluidly coupled to control mechanisms downstream from the core assembly and/or the housing. As another example, the inner ends of the permeate ports may be closed by a core assembly without any permeate flow passages. The cap at the outer end of each permeate port may then be eliminated, and the permeate ports may fluidly communicate with one or more permeate passages in the housing and/or with control mechanisms physically associated with the housing, e.g., in the shell of the housing. Alternatively, the control mechanisms may be fluidly coupled to the permeate ports external to the housing, e.g., by individual permeate pipes fluidly coupled through the housing shell to the outer ends of the permeate ports. The present invention is thus not restricted to the particular embodiments which have been described and/or illustrated herein but includes all embodiments and modifications that may fall within the scope of the claims.

The invention claimed is:

1. A fluid treatment arrangement comprising a core assembly having a longitudinal axis; a fluid treatment pack including a fluid treatment medium having a feed surface and an opposite permeate surface, a feed region extending along the feed surface of the fluid treatment medium, and a permeate region extending along the permeate surface of the fluid treatment medium, wherein the fluid treatment pack is spirally wound around the core assembly and includes a plurality of windings of the feed region, a plurality of windings of the permeate region, and a plurality of windings of the fluid treatment medium, each winding of the fluid treatment medium being positioned between a winding of the feed region and a winding of the permeate region, wherein the spirally wound fluid treatment pack has a plurality of axially adjacent sections, the feed region of one section fluidly communicating with the feed region of an adjacent section and the permeate region of the section being fluidly isolated from the permeate region of the adjacent section, and wherein each section of the spirally wound fluid treatment pack has a permeate port extending generally radially through the plurality of windings of the feed region, the plurality of windings of the fluid treatment medium, and the plurality of windings of the permeate region, each permeate port fluidly communicating with the windings of the permeate region and being fluidly isolated from the windings of the feed region; and one or more control mechanisms, a control mechanism being fluidly coupled to the permeate region of at least one section of the spirally wound fluid treatment pack to control a flow parameter in the permeate region of that section.

2. The fluid treatment arrangement of claim 1 wherein one or more control mechanisms includes a plurality of control mechanisms, each control mechanism being fluidly coupled to a permeate region of a section to control a flow parameter in the permeate region of that section.

3. The fluid treatment arrangement of claim 2 wherein each control mechanism is fluidly coupled to the permeate region of only one section.

4. The fluid treatment arrangement of claim 1 wherein the fluid treatment medium comprises a first fluid treatment medium and the fluid treatment pack further includes a second fluid treatment medium having a feed surface and a permeate surface and wherein the spirally wound fluid treatment pack includes the plurality of windings of the feed region, a plurality of windings of the first fluid treatment medium, a plurality of windings of the permeate region, and a plurality of windings of the second fluid treatment medium.

5. The fluid treatment arrangement of claim 1 wherein the feed region includes spacers and flow spaces that are defined by the spacers and are substantially free of structure.

6. The fluid treatment arrangement of claim 1 wherein the feed region comprises a porous sheet material extending along the feed surface of the fluid treatment medium.

7. The fluid treatment arrangement of claim 1 wherein the spirally wound fluid treatment pack has first and second opposite axial ends and the feed region extends continuously through adjacent axial sections.

8. The fluid treatment arrangement of claim 1 wherein the permeate region comprises a porous sheet material extending along the permeate surface of the fluid treatment medium.

9. The fluid treatment arrangement of claim 1 wherein the spirally wound fluid treatment pack has a first axial end, the plurality of windings of the feed region fluidly opening onto the first axial end and the plurality of windings of the permeate region being fluidly sealed at the first axial end.

10. The fluid treatment arrangement of claim 1 wherein the spirally wound fluid treatment pack has first and second axial ends, the plurality of windings of the feed region fluidly opening onto the first and second axial ends and the plurality of windings of the permeate region being fluidly sealed at the first and second axial ends.

11. The fluid treatment arrangement of claim 1 wherein the permeate ports in the spirally wound fluid treatment pack fluidly communicate with one or more passages in the core assembly.

12. The fluid treatment arrangement of any of claim 1 wherein the core assembly includes a plurality of passages separated from one another, each permeate port in the spirally wound fluid treatment pack fluidly communicating with only one of the plurality of passages, no other permeate port being in fluid communication with said one passage.

13. The fluid treatment arrangement of claim 1 wherein each control mechanism is physically associated with the core assembly.

14. The fluid treatment arrangement of claim 1 wherein a plurality of control mechanisms are operatively associated with the plurality of permeate ports.

15. The fluid treatment arrangement of claim 1 wherein a plurality of control mechanisms provide a permeate flux in each section of the spirally wound fluid treatment pack that is no greater than about 5 times the average of the permeate fluxes in all of the sections of the spirally wound fluid treatment pack.

16. The fluid treatment arrangement of claim 15 wherein the control mechanisms provide a permeate flux in each section of the spirally wound fluid treatment pack that is no greater than about 2 times the average of the permeate fluxes in all of the sections of the spirally wound fluid treatment pack.

17. The fluid treatment arrangement of claim 15 wherein the control mechanisms provide a permeate flux in each section of the spirally wound fluid treatment pack that is no greater than about 1.5 times the average of the permeate fluxes in all of the sections of the spirally wound fluid treatment pack.

18. The fluid treatment arrangement of claim 15 wherein the permeate fluxes in the sections of the spirally wound fluid treatment pack are substantially equal to one another.

19. A fluid treatment assembly comprising a fluid treatment arrangement of claim 1 and a housing, wherein the fluid treatment arrangement is positioned in the housing and the housing includes a feed inlet fluidly coupled to the feed region of the fluid treatment arrangement to supply feed fluid to the plurality of windings of the feed region and a retentate outlet fluidly coupled to the feed region of the fluid treatment arrangement to discharge retentate fluid from the plurality of windings of the feed region.

20. The fluid treatment assembly of claim 19 wherein the housing includes one or more permeate outlets fluidly coupled to the plurality of permeate ports in the spirally wound fluid treatment pack to discharge permeate from the permeate ports.

21. A method of treating a fluid comprising:
passing a feed fluid axially through spiral windings of a feed region and along spiral windings of a fluid treatment medium, including directing feed fluid along a feed surface of the fluid treatment medium;
passing a portion of the feed fluid through the fluid treatment medium and along spiral windings of a permeate region, including directing permeate from a permeate surface of the fluid treatment medium into adjacent axial sections of the permeate region which are fluidly isolated from one another;
passing the permeate from windings of the permeate region in each axial section into a permeate port that extends through the windings of the feed region, the windings of the fluid treatment medium, and the windings of the permeate region in the section; and
passing permeate from a permeate port through a control mechanism fluidly coupled to the permeate port, including controlling a flow parameter in the permeate region of the corresponding section.

22. The method of claim 21 wherein passing permeate from a permeate port includes passing permeate from each permeate port through a control mechanism fluidly coupled to the permeate port, including controlling a flow parameter in the permeate region of the corresponding section.

23. The method of any of claim 22 wherein passing permeate from each permeate port through a control mechanism coupled to the permeate port includes establishing a predetermined relationship of the flow parameters from section to section.

24. The method of claim 23 wherein establishing a predetermined relationship of flow parameters includes providing substantially equal permeate flux through the fluid treatment medium in each section.

25. The method of claim 21 wherein passing a feed fluid axially through spiral windings of a feed region includes passing feed fluid edgewise through a porous sheet material.

26. The method of claim 21 wherein passing the feed fluid axially through spiral windings of a feed region includes passing feed fluid through flow spaces which are substantially free of structure.

27. The method of any of claim 21 wherein passing a portion of the feed fluid axially along spiral windings of a permeate region includes directing permeate edgewise through a porous sheet material.

28. The method of any of claim 21 further comprising passing permeate from an open inner end of each permeate port into a flow passage in a core assembly.

* * * * *